(12) United States Patent
Morita et al.

(10) Patent No.: US 7,572,174 B2
(45) Date of Patent: Aug. 11, 2009

(54) ABRASIVE GRAIN AND GRINDSTONE

(75) Inventors: Hiroshi Morita, Hoi-gun (JP);
Tomoyuki Kasuga, Kariya (JP); Shinji Soma, Handa (JP)

(73) Assignee: JTEKT Corporation, Osaka (JP)

( * ) Notice: Subject to any disclaimer, the term of this patent is extended or adjusted under 35 U.S.C. 154(b) by 97 days.

(21) Appl. No.: 11/230,886

(22) Filed: Sep. 21, 2005

(65) Prior Publication Data
US 2006/0111031 A1 May 25, 2006

(30) Foreign Application Priority Data
Sep. 22, 2004 (JP) .............................. 2004-274352
Mar. 28, 2005 (JP) .............................. 2005-090303

(51) Int. Cl.
*B23F 21/03* (2006.01)

(52) U.S. Cl. ...................................... 451/443; 451/541
(58) Field of Classification Search .................. 51/293,
51/298, 309; 428/404; 451/540, 541, 542,
451/443, 442, 444
See application file for complete search history.

(56) References Cited

U.S. PATENT DOCUMENTS

| | | | | |
|---|---|---|---|---|
| 4,518,397 | A | * | 5/1985 | Leitheiser et al. .............. 51/293 |
| 5,080,975 | A | * | 1/1992 | Komaki et al. ............... 428/404 |
| 5,087,435 | A | * | 2/1992 | Potter et al. .................. 423/446 |

* cited by examiner

*Primary Examiner*—Jacob K Ackun, Jr.
(74) *Attorney, Agent, or Firm*—Oblon, Spivak, McClelland, Maier & Neustadt, P.C.

(57) ABSTRACT

An abrasive grain 1 includes a crystal defect CD in its crystal structure CS. The crystal defect CD is formed by a laser irradiation.

16 Claims, 8 Drawing Sheets

ABRASIVE GRAIN AND GRINDSTONE

INCORPORATION BY REFERENCE

The present application claims priority under 35 U.S.C. §119 to Japanese Patent Applications No. 2004-274352, filed on Sep. 22, 2004 and No. 2005-090303, filed on Mar. 28, 2005. The contents of that application are incorporated herein by reference in their entirety.

BACKGROUND OF THE INVENTION

1. Field of the Invention

This invention relates to an abrasive grain and a grindstone using plural number of the abrasive grain which performs self dressing function appropriate for grinding.

2. Discussion of the Background

Where a conventional grindstone grinds a workpiece made from iron material, ceramic material or etc., plural number of a hard abrasive grain, for example diamond or cubic boron nitride (CBN), is used for the grindstone. The grindstone is made from the steps of mixing the abrasive grains and vitrified bond or the like, and sintering the mixture. As shown in FIG. 5(a), a grinding wheel 100 is constructed from a core 103 and the grindstone (the abrasive grains 101 and the bond 102) glued on the circumference of the core 103. One part of each grain 101 crops out on the surface 100a of the grindstone and its surface is previously formed into microscopic roughness working as cutting edges 104 by a dresser, for example rotary diamond dresser (not shown).

Where the grinding wheel 100 includes the abrasive grains 101 whose diameter is comparative large (for example #80 to #120), each cutting edge 104 is worn and flattened due to the contact with the workpiece in the sequential grinding, thereby a flat surface 101a appears, as shown in FIG. 5(b). In the case of continuing to grind in such situation, because the grinding resistance increases between the workpiece and each surface 101a of the abrasive grains, grinding burn may occur and the grinding quality may deteriorate. To avoid the grinding burn, the dresser is used for deforming the flattened grains 101 to the microscopic roughness, thereby the cutting edges 104 are regenerated and the sequential grinding would be resumed.

However, where the grinding wheel 100 grinds the workpiece made from a hard material such as quenching steel, the abrasive grains 101 are remarkably worn. The grain 101 of diamond or CBN is too hard to perform self dressing function which regenerates the cutting edges 104 on its own surface due to the crack generated by the grinding load. Therefore, the grinding wheel 100 requires the dressing in advance and before the surface of the grain is flattened in the sequential grinding, thereby there may increase the cost related to the dressing.

Further, in case that the grinding wheel 100 has hard abrasive grains 101 and strong bond 102, the diamond grains of the dresser may be damaged during the dressing. Thus, the dressing condition must be set particularly.

SUMMARY OF THE INVENTION

In view of the foregoing, it is an object of the present invention to provide an abrasive grain which performs self dressing function even though the grain is hard, for example diamond or CBN, and to provide a grindstone having such abrasive grains. In order to achieve the above and other objects, an aspect of the present invention provides an abrasive grain of which crystal structure has one ore more crystal defect or microscopic gap formed by irradiation of laser.

Second aspect of the present invention provides a grindstone comprising plural grains of which crystal structure has one or more crystal defect or microscopic gap formed by irradiation of laser.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
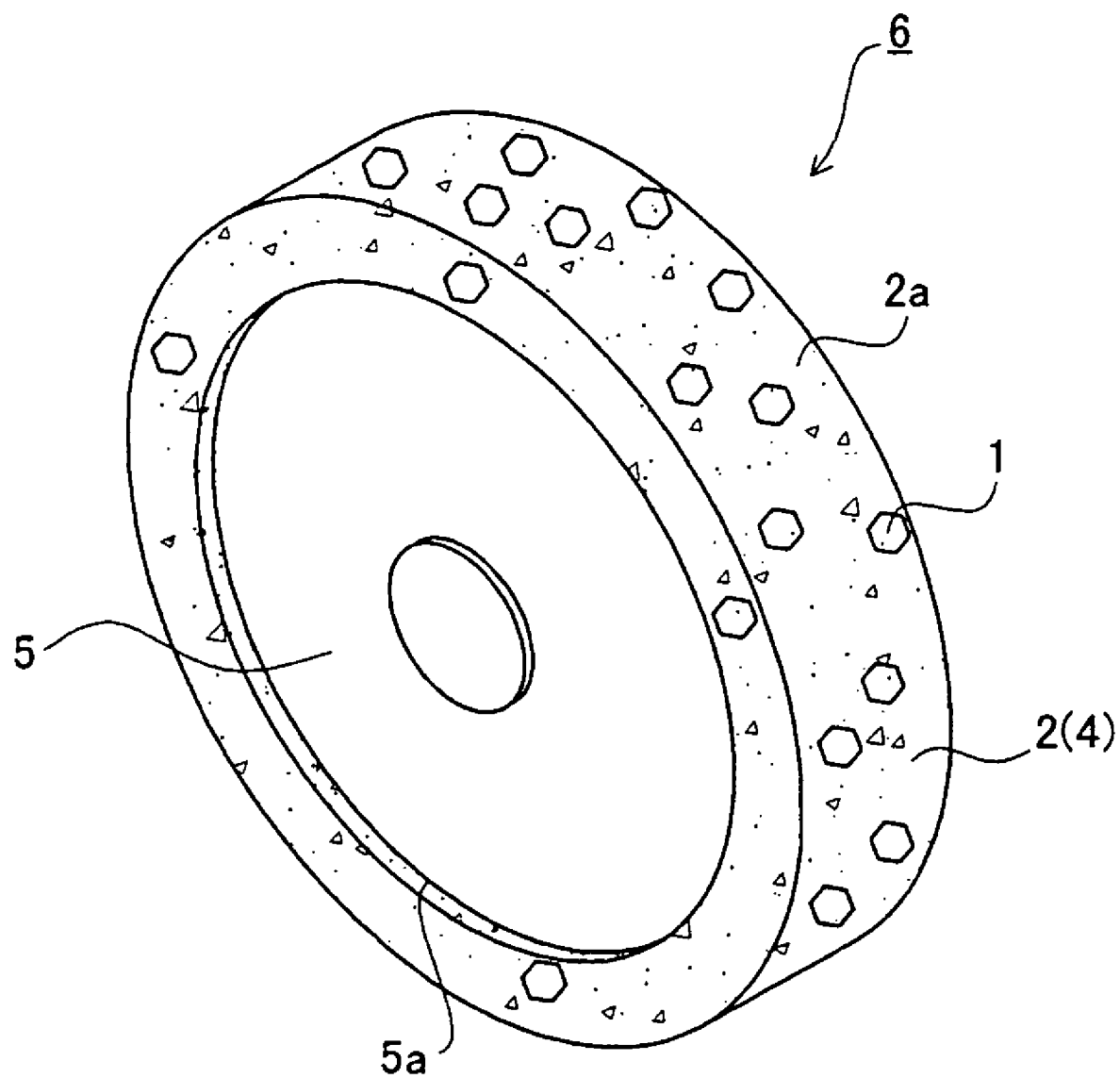
FIG. 1 is a schematic illustration of a grinding wheel having abrasive grains of first embodiment related to the invention.

An abrasive grain related to the present invention is inorganic or ceramic compound, for example diamond or cubic boron nitride (CBN). The grain has a strong and stable crystal structure so as to be very hard. For example, diamond is known as the hardest material whose crystal structure constructs a 3-D stable adamantane due to sp3 hybridised orbitals of electrons in their outer-most shell. On the other hand, CBN is known as comparison of diamond and is used for grinding tool or cutting tool. CBN has cubic crystal structure which is constructed by the regular connection between atoms of boron and nitrogen.

The abrasive grain is irradiated with a laser, for example femto second fiber laser, so as to be formed one or more crystal defect or microscopic gap inside. The abrasive grain is transparent or translucent in order to prevent the laser from reflection or scattering on its surface, thereby the laser irradiation reaches and focuses inside of the grain so that strong energy concentrates to the specific region in the crystal structure. Further, the femto second fiber laser is able to eliminate heat influence to the abrasive grain so as to easily focus to the inside. The condition of the laser (wavelength, average output or etc.) can be selected due to the feature of the abrasive grain.

The crystal defect or the microscopic gap means geometric or 3-D irregular of the crystal lattice in microscope and affects the feature of the material. There are some kinds of defect; a spot defect generated by an impurity atom doped into the crystal lattice; a transposition continuously generated by an atom arrangement irregular in line; a surface defect generated on the surface of the crystal lattice or between two neighbor lattices; and etc. It is known that the defect or gap is formed by some reasons. Specifically, high energy of the laser irradiation causes a modification in/on a part of the crystal structure so that the crystal structure partially collapses in the microscopic region where a chaos generates. Namely, the crystal defect or the microscopic gap makes the crystal structure unstable and affects the physical feature. Therefore, because of the laser irradiation, the crystal defect or the microscopic gap is artificially formed in/on one part of the crystal structure of the abrasive grain. The crystal defect or the microscopic gap can be one or combination of the spot defect, the line defect and the surface defect.

Because the abrasive grain includes the crystal defect or the microscopic gap inside, its crystal structure would become partially more unstable and slightly weaker than before the laser irradiation. Therefore, where a workpiece is ground with a grinding wheel including a grindstone which has the abrasive grains, a crack is generated from the point of the crystal defect or the microscopic gap, thereby one part of the grain is crushed and drops off. Roughness and cutting edges are regenerated on the surface of the abrasive grain remaining on the grinding wheel without the surface flattened by wear. Namely the abrasive grain is self dressed and regains the cutting edges, thereby the frequency of dressing by a dresser can be reduced. Further, because one part of the abrasive grain is crushed and drops off easily, the grinding wheel can be dressed by the dresser easily. Furthermore, because the dropping off is stable, the amount of wear of the grinding wheel can be reduced per one dressing by the dresser. As a result, the durability of the grinding wheel becomes longer. Moreover, the load to the dresser is reduced so that the durability of the dresser also becomes longer.

The grindstone related to the present invention includes plurality of the abrasive grain whose crystal structure has the crystal defect or the microscopic gap formed by the laser irradiation. The grindstone is made from the steps of; mixing the abrasive grains and a bond such as vitrified bond; and sintering the mixture of the abrasive grains and the bond. Then, the plural grindstones are glued onto a core of the grinding wheel. The core is made from a metal and forms a disk-like in consideration of use for a grinding machine. The grinding wheel is constructed by the grindstone and the core. The grindstone includes the abrasive grains, the bond and plural pores. Namely, the grindstone related to the present invention comprises the abrasive grains in which the crystal defect or the microscopic gap exists and which have the self-dressing function. Therefore, even for the long grinding cycle because of the self dressing function, the grinding wheel with the grindstone is able to grind well and problems such as the grinding burn would occur for fewer times due to the heat of the grinding resistance.

The abrasive grains may be irradiated with the laser before mixing with the bond or after gluing the grindstone onto the core. The latter is favorable because the depth of the crystal defect or the microscopic gap is able to be constant so as to expect the level of the self-dressing function.

Where the abrasive grains are irradiated with the laser before the mixing, it is unnecessary that all abrasive grains are irradiated with the laser. In this case, there can be mixed normal (non-irradiated) grains and irradiated grains by appropriate ratio so that there can be produced the grindstone that has the both grain's functions of hardness and self-dressing. Thus, the grinding performance of the grindstone is precisely able to be adjusted.

There may intermingle the non-irradiated grains and the irradiated grains, or the layers of the non-irradiated grains and the irradiated grains. The grindstone has the non-irradiated grains that grind highly, and the irradiated grains that perform the self-dressing function due to the crystal defect or the microscopic gap inside. Where the same composition of grain is used for between irradiated and non-irradiated, the grinding performance is able to be constant approximately and the dressing by the dresser can take place stably.

The grindstone may be glued onto the lateral surface of the core of the grinding wheel. In this case, there exist the abrasive grains irradiated with the laser on the lateral surface of the grinding wheel. Where an end surface of the workpiece is ground with the lateral surface of the grinding wheel, the abrasive grains generally tend to be worn and to be flattened due to the surface contact. As a result, coolant is not supplied enough into the grinding area, thereby the grinding resistance increases and the grinding burn may occur. In the grinding wheel with the grindstone related to the present invention, however, the abrasive grains on the lateral surface of the grinding wheel perform the self-dressing function so that the roughness and the cutting edges are regenerated on the surface of each grain. Therefore, the coolant is able to be supplied into the grinding area so that the grinding burn would not occur. Even in the case that the grinding wheel is dressed by the dresser, the frequency of the dressing can be reduced so that the durability of the grinding wheel becomes longer. There can intermingle the non-irradiated grains and the irradiated grains on the lateral surface off course.

The lateral surface of the grindstone may shape back taper on the circumference of the core of the grinding wheel. To prevent the grinding burn during the face grinding, where the grinding wheel has the back tapered grindstone narrowing inwardly, the contact area becomes a line contact between the grindstone and the workpiece, thereby the coolant is supplied enough into the grinding area and the grinding burn hardly occurs. In the case of the dressing, leaned about 8-10 degree, a cup rotary diamond dresser is generally used for dressing the back tapered grinding wheel. During this dressing, although the grindstone contacts with the dresser by a face contact that tends to flatten the lateral surface of the tapered grindstone, the grinding wheel includes the self-dressing abrasive grains irradiated with the laser so that the dressing frequency is reduced or the dressing becomes unnecessary. Therefore, the lateral surface of the grindstone is prevented from flattened.

The grinding wheel may intermingle the layers of the irradiated and non-irradiated abrasive grains alternately in the rotational direction. In this case, the both layers contact the grinding area alternately, thus the grinding performs well at the non-irradiated layers and the self-dressing function performs well at the irradiated layers. Where the constructions of both layers are the same but the grains are different (irradiated/non-irradiated), fine steps between both layers can be eliminated so that vibration is reduced and the grinding performs well.

The grinding wheel may intermingle the layers of the irradiated and non-irradiated abrasive grains on the circumferential and lateral surface. In the grinding with such both surface, the both layers contact with the workpiece so that the grinding performs well.

The grinding wheel may intermingle the layers of the irradiated and non-irradiated abrasive grains on the lateral surface. In the face grinding, the both layers contact with the workpiece so that the grinding performs well. Especially, the fine steps between both layers can be eliminated so that vibration is reduced and the grinding performs well.

Figure 2:
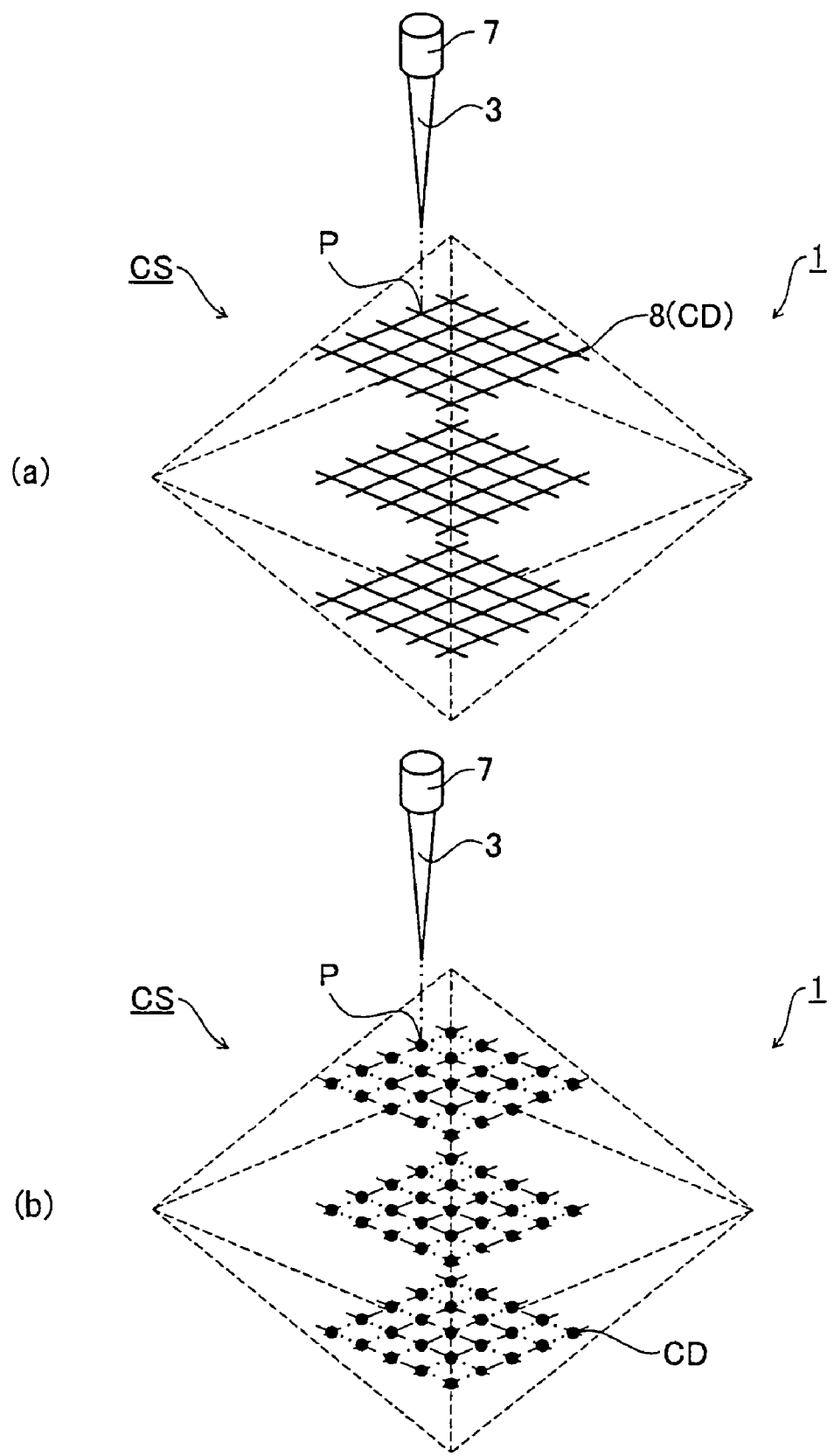
FIG. 2 is a schematic illustration of an example of irradiating the crystal structure of the abrasive grain of the first embodiment with a laser.
Figure 3:
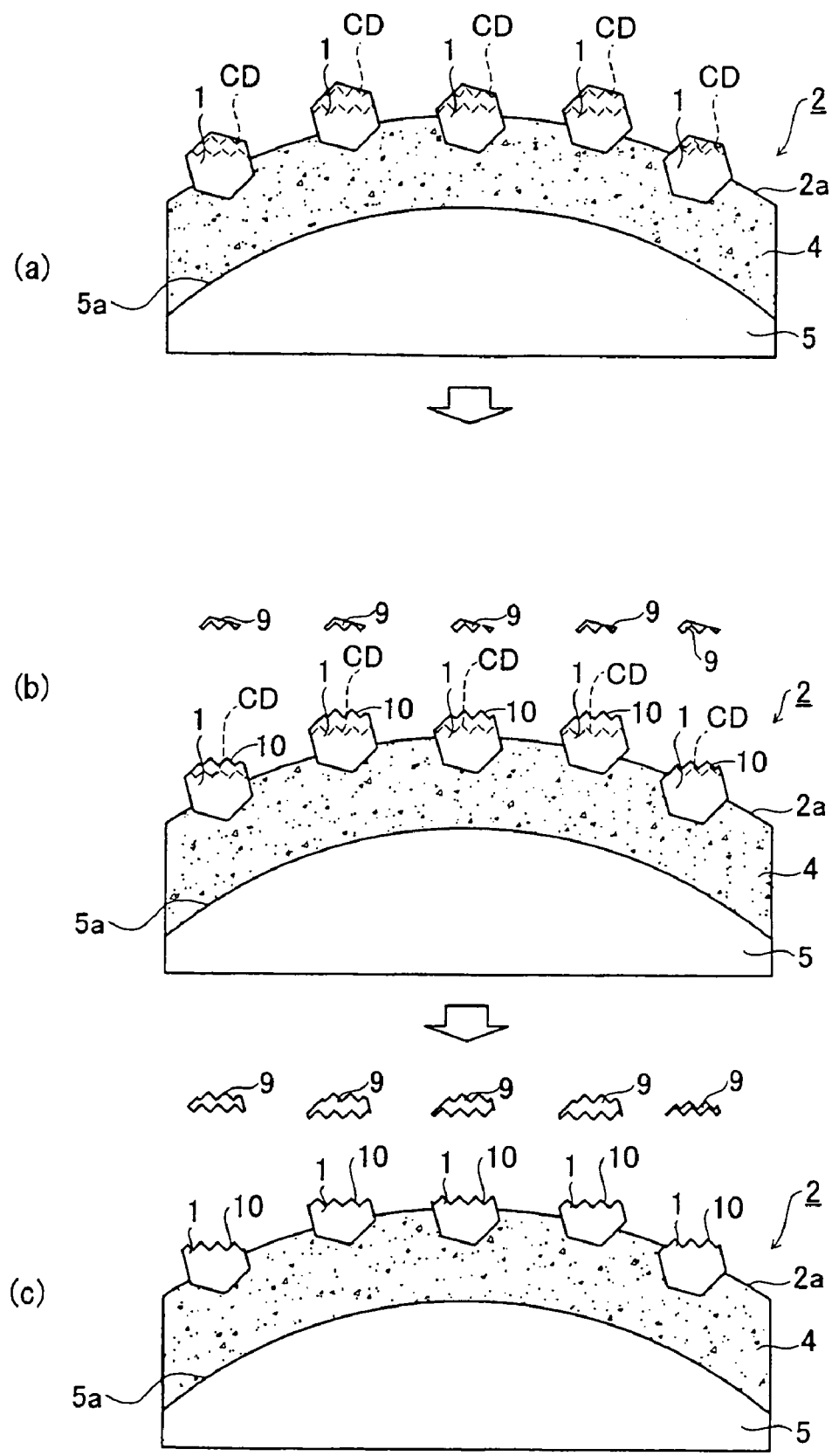
FIG. 3 is a schematic illustration of a self dressing function of the abrasive grains of the first embodiment.

First embodiment of the present invention will be described with reference to FIGS. 1 to 3. FIG. 1 schematically shows a grinding wheel 6 comprising abrasive grains 1 and grindstone 2. FIG. 2 schematically shows an example of the crystal structure of the abrasive grain irradiated with a laser. FIG. 3 schematically shows a self dressing function of the abrasive grains.

A grindstone 2 according to the first embodiment is made from steps of; mixing fine cubic boron nitride (CBN) grains 1 (grain size is #100) and binder 4 of vitrified bond; and sintering the mixture in a sintering furnace by high temperature. A grinding wheel 6 is constructed with that the grindstone 2 is solidly glued on the circumferential surface 5a of a core 5 to be attached to a grinding machine.

The abrasive grains 1 are irradiated with a laser 3 to produce plural crystal defects CD (including microscopic gaps). The laser irradiation takes place as the below condition.

<Irradiating Condition>

Laser: Yb femto second fiber laser

Central wavelength: 1040 nm (nanometers)

Width of pulse: 500 fs (femto seconds) equal to $500*10^{-15}$ seconds

Energy of pulse: 1.5 µJ (micro Joule)

As schematically shown in FIG. 2(a), the laser 3 is irradiated from a laser irradiator 7 in order to reach laser focus points P inside the crystal structure CS of cubic crystal system. Continuing to irradiate with the laser 3, the laser irradiator 7 is able to change the position of the laser focus points P in a microscopic area. Thus, a linear gap 8 is formed by the laser 3 continuously irradiated and moving its focus point P inside the crystal structure CS. The width of the gap 8 is approximately one to tens of micrometers. A latticed crystal defect CD is generated by forming plural number of the gaps 8 which cross each other in a right angle. Namely, the gaps 8 of the crystal defect CD are formed by a pore which is formed by a partial disappearance from the inside of the atom due to the continuous laser irradiation. As shown in FIG. 2(a), where the focus points P vertically change in the crystal structure CS, there are formed plural layers of the latticed crystal defect CD. The abrasive grain 1 of CBN is transparent so that the irradiated laser 3 is able to reach inside without reflection or scattering. On the other hand, the crystal defects CD are able to be formed by plural spots of the atom pore which is formed by discontinuous irradiations as shown in FIG. 2(b).

Therefore, the crystal defects CD formed in the crystal structure CS affect physical feature of the abrasive grain 1. Specifically, the mechanical strength of the abrasive grain 1 is slightly reduced at the crystal defects CD. As a result, where the abrasive grain 1 is loaded more than the defined strength, a crack is generated at the point of the crystal defect CD in the abrasive grain 1 so that one part of the grain 1 is crushed and drops off as a fine piece 9, as shown in FIG. 3(b).

Next, the grinding process with the grindstone 2 of the first embodiment will be described. The grinding wheel 6 with the grindstone 2 is attached to the grinding machine and is rotated in high speed. A part of each abrasive grain 1 crops out on the grinding surface 2a of the grindstone 2 as shown in FIG. 3(a). A workpiece is ground in the predetermined shape and precise with the hard abrasive grains 1 of the rotating grinding wheel 6. In this grinding process, the abrasive grains 2 are strongly loaded by the contact with the workpiece. Where the surface of each grain 2 is comparatively flattened, the load becomes so strong that one part of each grain 2 is crushed and drops off as the fine piece 9 from one of the crystal defects CD inside, as shown in FIG. 3(b). As a result, the abrasive grains 2 regenerate a roughness as cutting edge 10. Namely, due to the load of the grinding process, the cutting edges 10 are regenerated on the surface of each abrasive grain 2 and each of the regenerated cutting edges 10 grind the workpiece. The crystal defects CD cause the reduction of the mechanical strength of the CBN abrasive grains 2 and give the abrasives 2 the self dressing function. Therefore, the abrasive grains 2 are prevented from being flattened causing the grinding resistance so that grinding burn is reduced.

Further, because there are formed three layers of the crystal defects CD as shown in FIG. 2(a), new cutting edges 10 are regenerated by dropping the fine piece 9 off even if each abrasive grain 2 is worn and flattened as shown in FIG. 3(c).

As described above, according to the first embodiment, the frequency of the dressing is reduced so that the cost related to the dressing is able to be reduced. Further, the grinding resistance does not increase so that there is able to be reduced the problem affecting to the quality of the grinding such as the grinding burn. Thus, the productivity increases. Furthermore, even though the dressing would take place, the dressing requirement is able to be loosened because the diamond grains of the dresser are not hurt by the abrasive grains 2 with the crystal defects CD.

Figure 6:
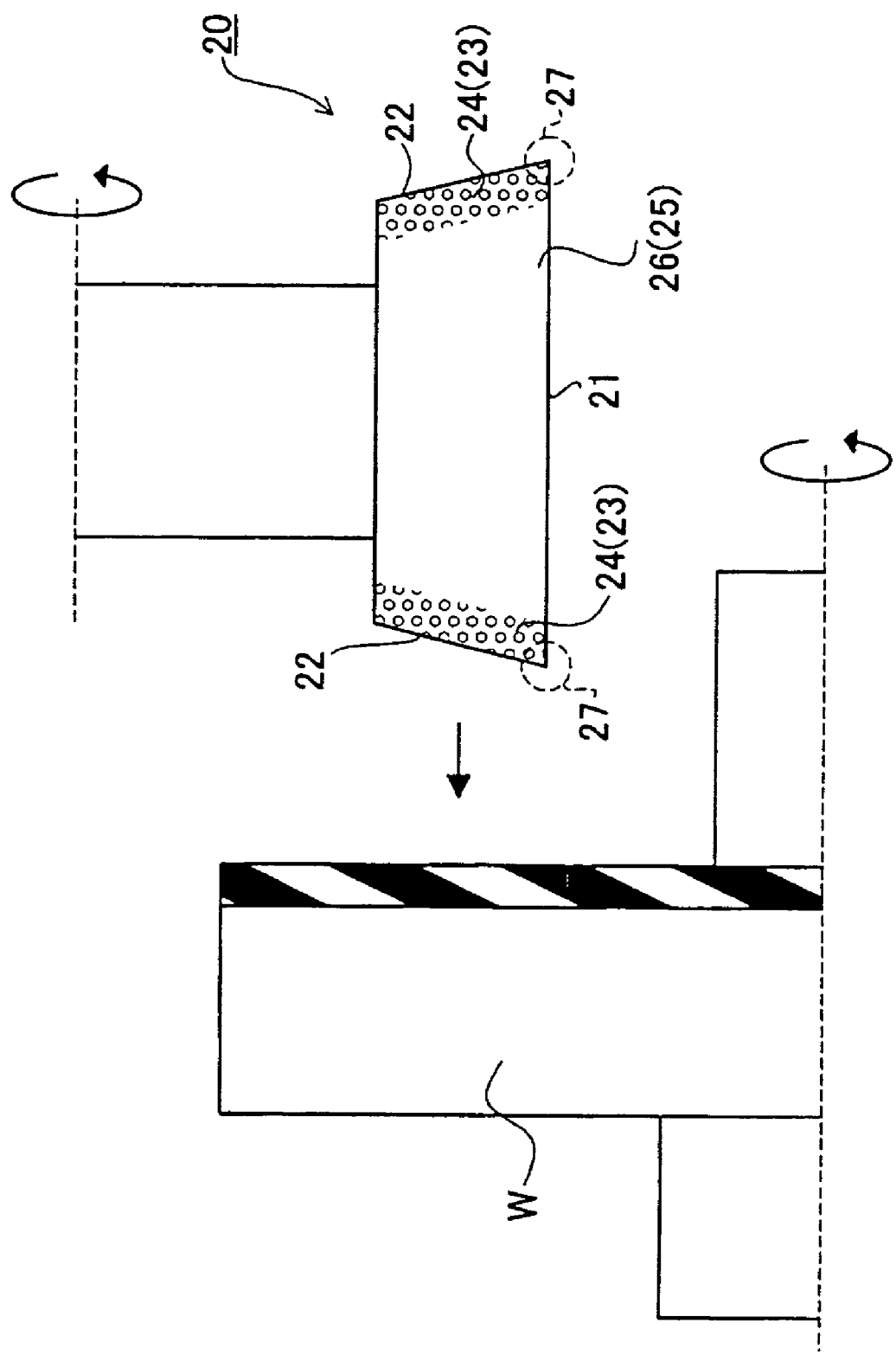
FIG. 6 is a schematic illustration of a grinding wheel of second embodiment related to the invention.

Next, second embodiment will be described with reference to FIG. 6. FIG. 6 schematically shows a grindstone 20 related to the second embodiment used for face grinding. Because laser irradiation to form crystal defects is the same condition of the first embodiment, the detail explanation will be omitted. Further, the same things of the first embodiment will be lettered as well as the first embodiment, and the detail explanation will be omitted.

As shown in FIG. 6, the grindstone 20 has back-tapered lateral surfaces 22 narrowing, inwardly from the circumferential surface 21. Each lateral surface 22 includes a laser irradiated layer 24 of which each abrasive grain 23 has the crystal defects or microscopic gaps inside the crystal construction formed by the laser irradiation. And a laser non-irradiated layer 26 having non-irradiated grains 25 exists at the circumferential surface 21 and the mid portion between the both irradiated layers 24. The grindstone 20 is made from the steps of the mixing and the sintering as well as the first embodiment, and is glued onto the core of the grinding wheel.

In face grinding with the grindstone 20 related to the second embodiment, an end face of the workpice W is ground with one of the laser irradiated layer 22 of the grindstone 20. During the face grinding process, each abrasive grain 23 of the irradiated layer 22 is loaded by the contact between the grindstone 20 and the workpiece W, and then one part of the grain 23 drops off because of the crushing. (The crushing mechanism has been described in the part of the first embodiment, so its explanation is omitted.) As a result, the lateral surface 22 of the grindstone 20 with the irradiated layer 24 does not be flattened by the wear in the face grinding so that the new cutting edges would be regenerated due to the self-dressing function of the abrasive grains 23 even during the face grinding process. Therefore, the coolant is supplied enough into the grinding area so that the grinding burn hardly occurs. Especially, because the grindstone 20 is back-tapered, the grindstone 20 is prevented from face contact with the workpiece W, thereby the grinding resistance is reduced.

Where the grindstone 20 is shaped into the back-taper, a cuplike dresser is used for the dressing. Because each lateral surface 22 of the grindstone 20 includes the laser irradiated layer 24, the abrasive grains 23 are crushed easier than the conventional grindstone. Thus, where the dresser contacts with one of the lateral surface 22 in predetermined angle in order to prevent from face contact, one part of each grain 23 is crushed by the load of the dresser onto the grindstone 20. As a result, the cutting edges are easily regenerated.

As described above, according to the grindstone 20 related to the second embodiment, the lateral surfaces 22 are able to be dressed easier and are prevented from flattened. Therefore, the grinding quality is stably kept during the face grinding. In addition, where the circumferential surface 21 is dressed, new cutting edges are regenerated at edge portions 27 between the circumferential and lateral surfaces 21-22. In the back-tapered grindstone 20, because the edge portions 27 work for the face grinding, the dressing for the lateral surfaces 22 may be eliminated.

Figure 7:
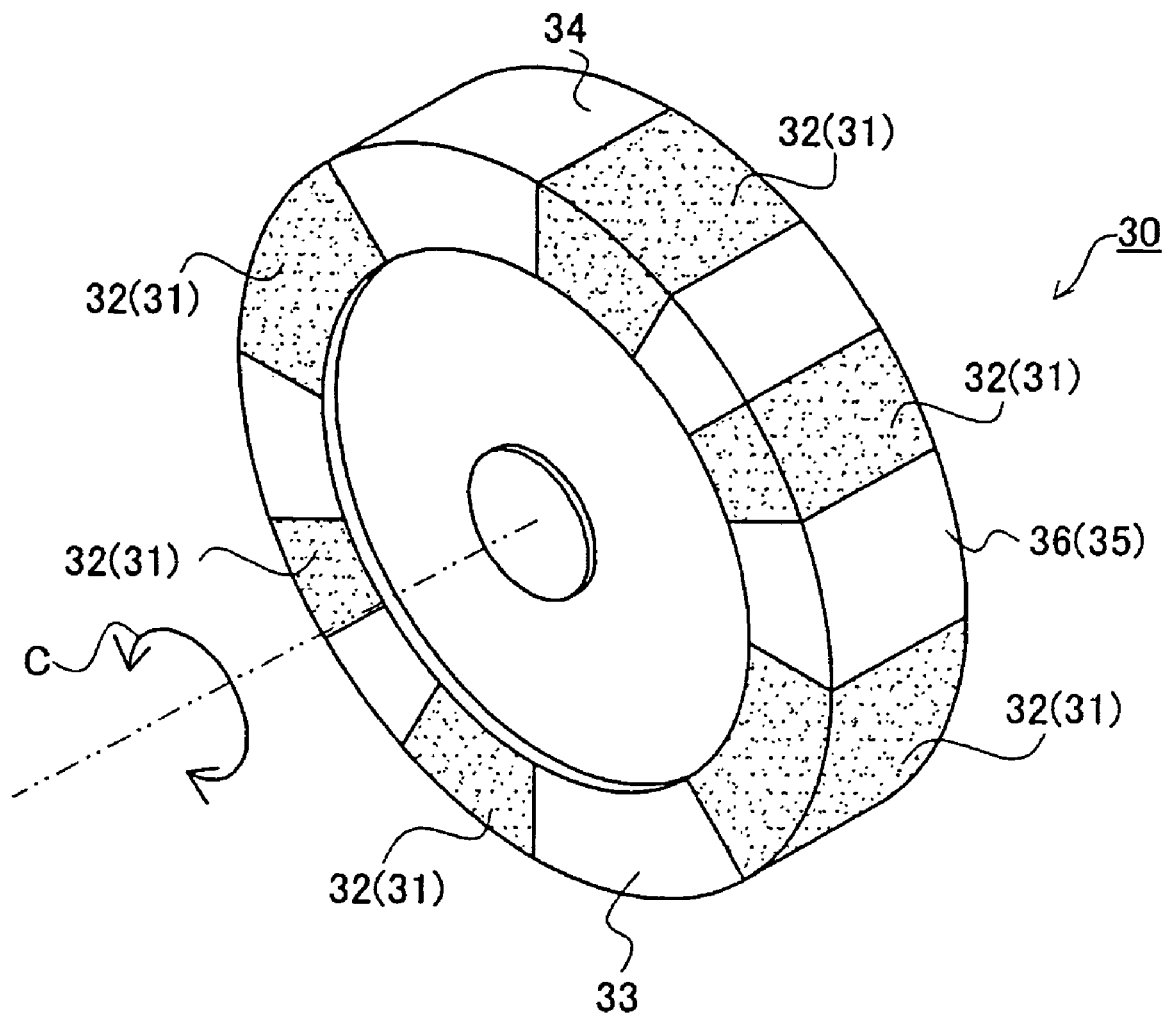
FIG. 7 is a schematic illustration of a grinding wheel of third embodiment related to the invention.

Next, third embodiment will be described with reference to FIG. 7 schematically showing a grindstone 30. The detail explanation of the same things of the first and second embodiments will be omitted.

As shown in FIG. 7, there are alternately disposed segments with the laser irradiated layers 32 and segments with the laser non-irradiated layers 36 on the lateral and circumferential surfaces 33-34 in the rotational direction C. The abrasive grains 31 in the laser irradiated layers 32 and its irradiation condition are the same of the first and second embodiment, so the detail explanation will be omitted. And the crushing mechanism of the grains 31 also will be omitted.

Ground with the rotating grindstone 30 related to the third embodiment, the workpiece is ground with the irradiated and non-irradiated layers 32 and 36 alternately. During the grinding process, one part of each abrasive grain 31 in the laser irradiated layers 32 is crushed and drops off so that steps are made between the both layers 32 and 36. As a result, even though the face grinding, the grindstone 30 is prevented from continuous face contact with the workpiece. Therefore, the coolant is able to be supplied into the steps so that the grinding resistance is reduced and the grinding burn hardly occurs. Where the irradiated grains 31 and the non-irradiated grains 35 have the same structure and their layers 32 and 36 have the same concentration, the crushing feature is little different between the both grains 31 and 35. Therefore, each segment with the both layers 32 and 36 has little different feature. As a result, the steps would not become large so that the vibration generated by the steps is reduced.

Figure 8:
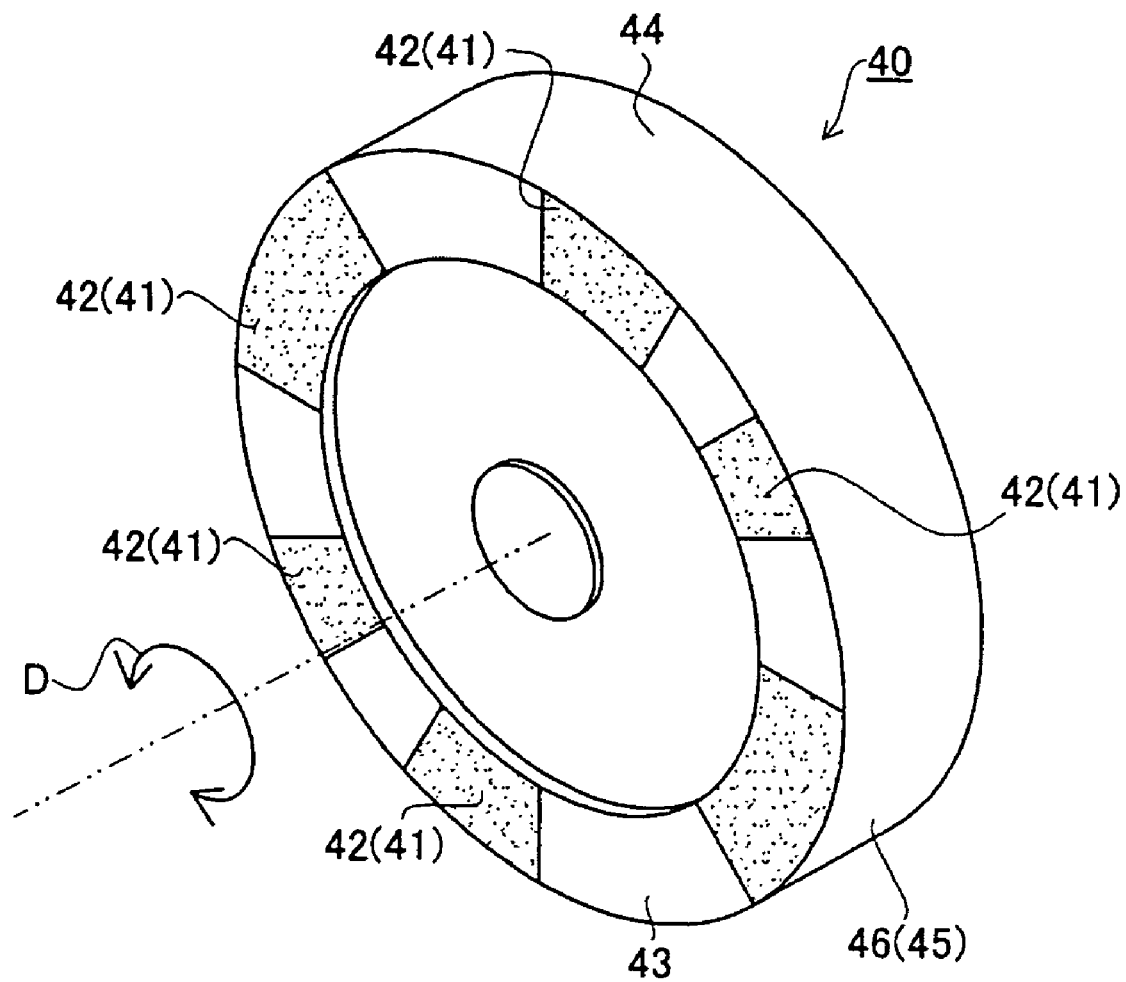
FIG. 8 is a schematic illustration of a grinding wheel of forth embodiment related to the invention.

Next, forth embodiment will be described with reference to FIG. 8 schematically showing a grindstone 40. The detail explanation of the same things of the first to third embodiments will be omitted.

As shown in FIG. 8, the segments with the laser irradiated layers 42 dot the lateral surface 43 in the rotational direction D. Except for that, there are disposed the segments with the laser non-irradiated layers 46. Namely, what the irradiated layers do not exist on the circumferential surface is different from the third embodiment.

In the face grinding with the rotating grindstone 40 related to the forth embodiment, the workpiece is ground with the irradiated and non-irradiated layers 42 and 46 alternately. During the grinding process, one part of each abrasive grain 41 in the laser irradiated layers 42 is crushed and drops off so that steps are made between the both layers 42 and 46. As a result, even though the face grinding, the grindstone 40 is prevented from continuous face contact with the workpiece. Therefore, the coolant is able to be supplied into the steps so that the grinding resistance is reduced and the grinding burn hardly occurs. On the other hand, where cylindrical grinding takes place with the circumferential surface 44 with the non-irradiated grains 45, there are no steps such as the third embodiment so that the vibration generated by the steps is reduced.

As described above, according to the present invention, due to the crystal defect or the microscopic gap in the crystal structure, the grinding load makes the abrasive grains be crushed and drop the fine piece off, thereby the abrasive grains are self dressed and the cutting edges are regenerated. Therefore, the grinding burn hardly occurs and the dressing frequency is reduced. Additionally, where the non-irradiated abrasive grains are mixed with the irradiated grains, the self-dressing function is added to the conventional grinding feature. Specifically, the grinding burn is remarkably reduced in the face grinding.

Obviously, numerous modifications and variations of the present invention are possible in light of the above teachings. It is thereby to be understood that within the scope of the appended claims, the present invention may be practiced otherwise than as specifically described herein.

For example, the grindstone may include the laser irradiated and non-irradiated grains mixed in the same segment. In this case, the grindstone has the combined features of self-dressing and hard grains.

Figure 4:
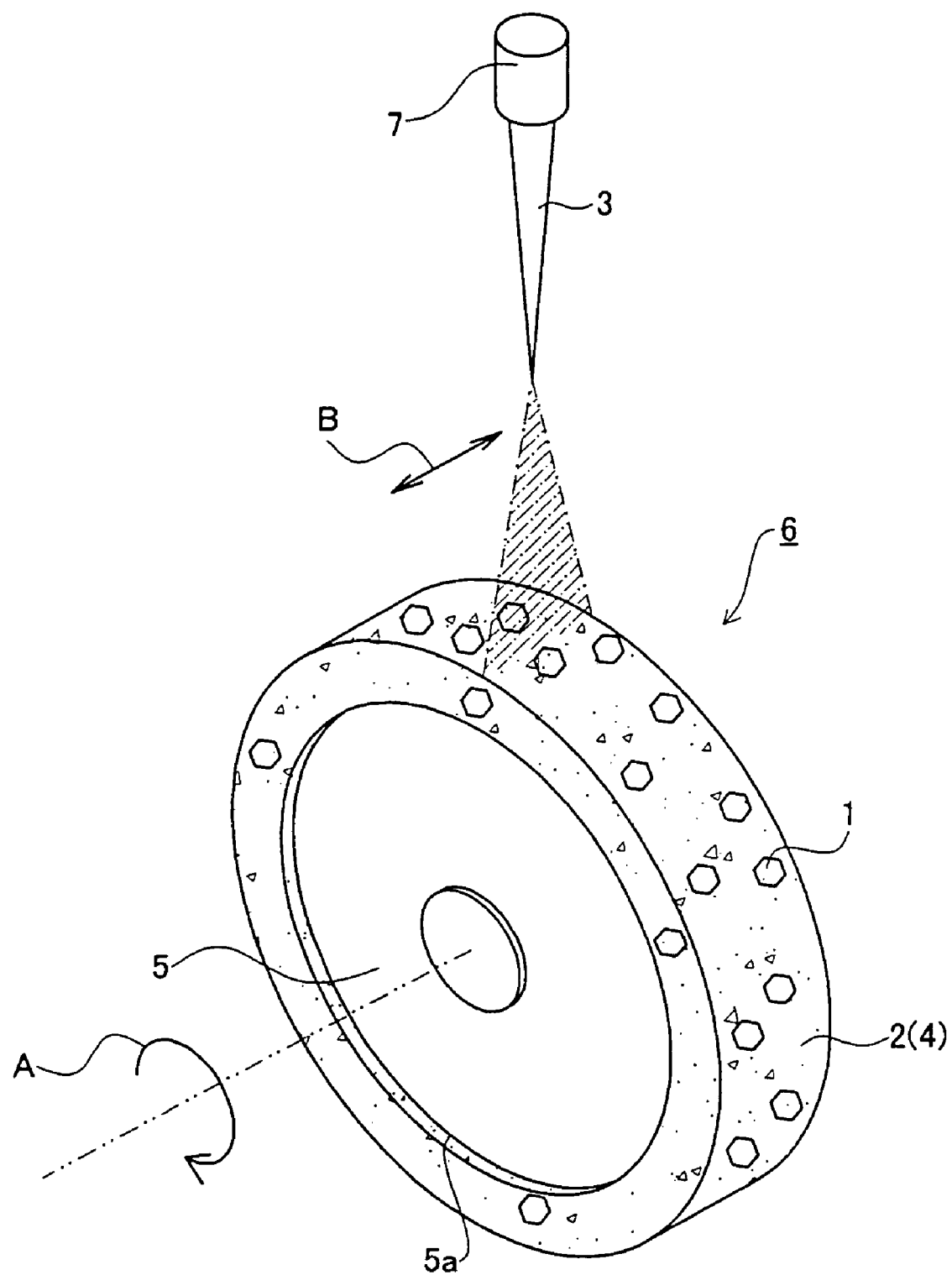
FIG. 4 is a schematic illustration of further example of irradiating the grinding wheel related to the present invention with the laser.
Figure 5:
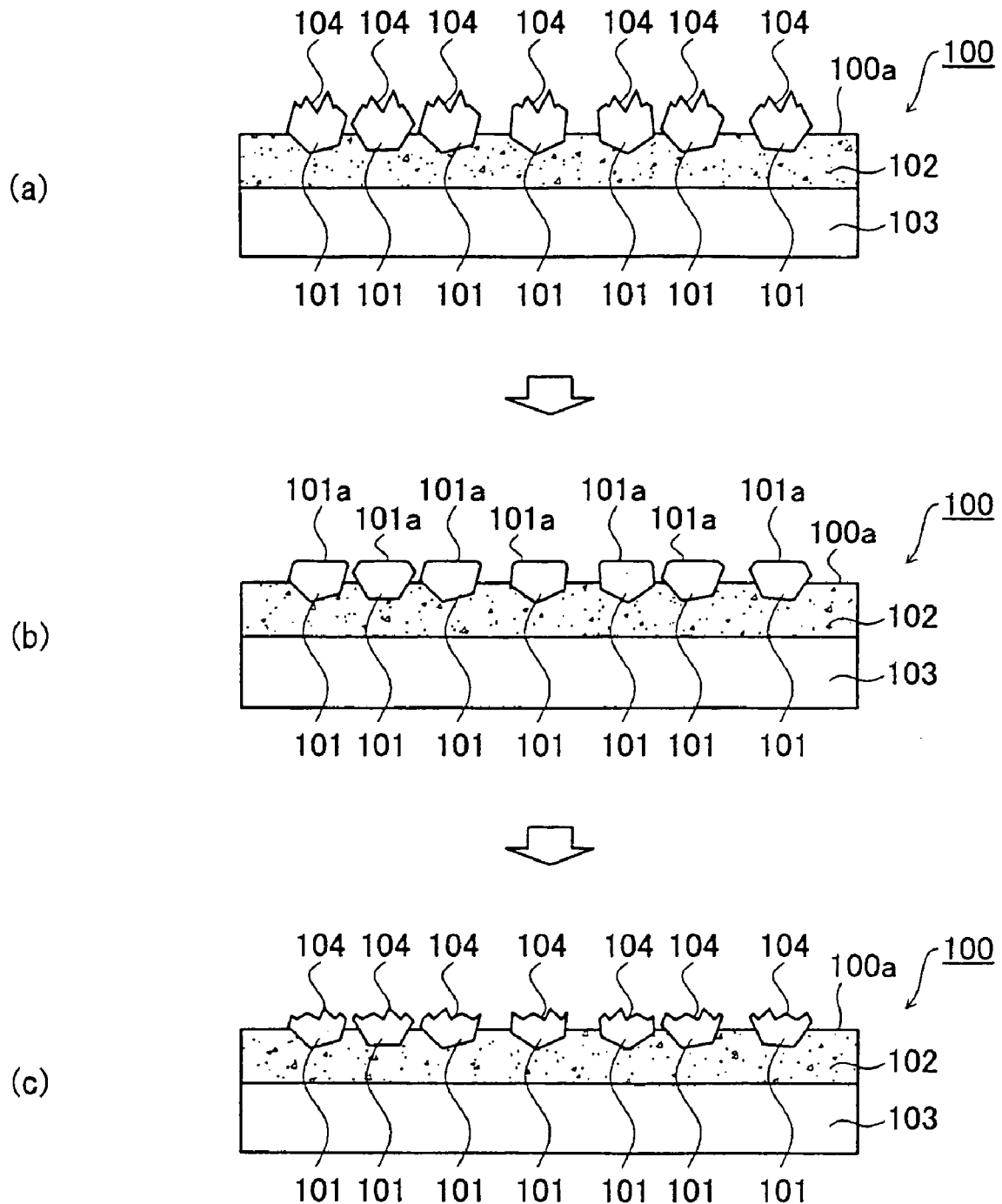
FIG. 5 is a schematic illustration of a conventional dressing process.

In addition, the laser irradiation may take place after the grinding wheel 6 is assembled as shown in FIG. 4. In this case, rotating in direction of A, the grinding wheel 6 is irradiated with the laser 3 and the laser irradiating point continuously moves in direction of B axially. Therefore, the circumferential surface 2a is able to be irradiated so that the crystal defects CD are formed inside the crystal structure CS of the abrasive grains whose one part is bare on the circumferential surface 2a. More, the laser irradiation may take place on the lateral surfaces related to the second to forth embodiments.

Further, the laser irradiation condition may be changed depending on the size of the grains, material of the workpiece or etc. There may set the wavelength, average output, pulse width of the laser or etc. Thus, the crushing feature of the abrasive grain is able to be adjusted.

Furthermore, there may be attached more than two kinds of abrasive layers on the grinding wheel.

Moreover, with changing the arrangement of the segments of the grindstone, the non-irradiated layers may be used for rough grinding and the irradiated layers may be used for finish grinding.

What is claimed is:

1. A grindstone comprising diamond or CBN abrasive grains:

each of the abrasive grains includes one or more crystal defect or microscopic gap formed by a laser irradiation, the crystal defect or microscopic gap having a size of at least one micrometer and being capable of playing a role in self dressing of the grain, wherein the one or more crystal defect or microscopic gap exists at a transparent or translucent location inside a crystal structure.

2. A grindstone according to claim 1, wherein:

the abrasive grains are mixed with laser non-irradiated abrasive grains.

3. A grindstone according to claim 1, wherein:

layers with the abrasive grains and layers with laser non-irradiated abrasive grains are disposed on a surface of the grindstone.

4. A grindstone according to claim 2, wherein:

the layers irradiated by the laser are disposed on a lateral surface of the grindstone.

5. A grindstone according to claim 4, wherein:

the lateral surface is back-tapered.

6. A grindstone according to claim 3, wherein:

the both type of layers are alternately disposed on a circumferential surface of the grindstone.

7. A grindstone according to claim 3, wherein:

the both type of layers are alternately disposed on a lateral surface of the grindstone.

8. The grindstone according to claim 1, wherein the laser is a Yb femto second fiber laser providing radiation with a pulse width of $500 \times 10^{-15}$ seconds, a central wavelength of 1040 nm and an energy of 1.5 micro Joules.

9. A grindstone comprising CBN abrasive grains:
each of the abrasive grains includes one or more crystal defect or microscopic gap formed by a laser irradiation, the crystal defect or microscopic gap having a size of at least a few hundred nanometers and being capable of playing a role in self dressing of the grain, wherein the one or more crystal defect or microscopic gap exists at a transparent or translucent location inside a crystal structure.

10. A grindstone according to claim 9, wherein:
the abrasive grains are mixed with laser non-irradiated abrasive grains.

11. A grindstone according to claim 9, wherein:
layers with the abrasive grains and layers with laser non-irradiated abrasive grains are disposed on a surface of the grindstone.

12. A grindstone according to claim 10, wherein:
the layers irradiated by the laser are disposed on a lateral surface of the grindstone.

13. A grindstone according to claim 12, wherein:
the lateral surface is back-tapered.

14. A grindstone according to claim 13, wherein:
the both type of layers are alternately disposed on a circumferential surface of the grindstone.

15. A grindstone according to claim 11, wherein:
the both type of layers are alternately disposed on a lateral surface of the grindstone.

16. The grindstone according to claim 9, wherein the laser is a Yb femto second fiber laser providing radiation with a pulse width of $500 \times 10^{-15}$ seconds, a central wavelength of 1040 nm and an energy of 1.5 micro Joules.

* * * * *